(12) United States Patent
Staples

(10) Patent No.: US 11,479,314 B2
(45) Date of Patent: Oct. 25, 2022

(54) DROPPER POST ASSEMBLY FOR A BICYCLE

(71) Applicant: D3 Innovation Inc., Squamish (CA)

(72) Inventor: Jonathan Staples, Garibaldi Highlands (CA)

(73) Assignee: D3 Innovation Inc., Squamish (CA)

( * ) Notice: Subject to any disclaimer, the term of this patent is extended or adjusted under 35 U.S.C. 154(b) by 46 days.

(21) Appl. No.: 16/908,220

(22) Filed: Jun. 22, 2020

(65) Prior Publication Data

US 2020/0317283 A1    Oct. 8, 2020

Related U.S. Application Data

(63) Continuation of application No. 16/837,722, filed on Apr. 1, 2020, now Pat. No. 10,787,215.

(60) Provisional application No. 62/839,594, filed on Apr. 26, 2019, provisional application No. 62/830,405, filed on Apr. 6, 2019.

(51) Int. Cl.
*B62J 1/08*    (2006.01)

(52) U.S. Cl.
CPC ............ *B62J 1/08* (2013.01); *B62J 2001/085* (2013.01)

(58) Field of Classification Search
CPC ..... B62K 19/36; B62J 1/06; B62J 1/08; B62J 1/10; B62J 2001/085; A47C 3/30; Y10T 403/32516; Y10T 403/32483
See application file for complete search history.

(56) References Cited

U.S. PATENT DOCUMENTS

| | | |
|---|---|---|
| 8,079,772 B1 | 12/2011 | Brennan et al. |
| 8,814,109 B2 | 8/2014 | Laird et al. |
| 9,688,331 B1 | 6/2017 | Shirai |
| 9,878,753 B2 | 1/2018 | Tsai |
| 9,969,448 B1 | 5/2018 | Chen |
| 10,549,803 B2 | 2/2020 | Shipman et al. |
| 2015/0232158 A1 | 8/2015 | Bouse et al. |
| 2017/0225731 A1 | 8/2017 | Hsu |

(Continued)

FOREIGN PATENT DOCUMENTS

| | | |
|---|---|---|
| TW | I562922 | 12/2016 |
| TW | 201730032 | 9/2017 |

(Continued)

OTHER PUBLICATIONS

Mad Suspension Manic Drop Post, information found onine at https://www.xfusionshox.com/products_detail/44.htm.

(Continued)

*Primary Examiner* — Daniel J Wiley
(74) *Attorney, Agent, or Firm* — Kevin Shipley; Marks & Clerk

(57) ABSTRACT

A dropper post assembly for supporting a bicycle seat can include an outer tube and an inner tube telescopically receivable in the outer tube and slidable within the outer tube between a retracted position in which a lower end of the inner tube is proximate a lower end of the outer tube and an extended position in which the lower end of the inner tube is axially spaced from the lower end of the outer tube. An actuator assembly may include an actuator body having a mounting portion connected to the lower end of the outer tube and a cartridge rod receiving portion, and may be configured so that when the inner tube is in the retracted position at least the upper surface of the cartridge rod receiving portion is nested within the inner tube.

20 Claims, 6 Drawing Sheets

(56) References Cited

U.S. PATENT DOCUMENTS

| | | |
|---|---|---|
| 2019/0283827 A1 | 9/2019 | Shipman et al. |
| 2019/0300088 A1 | 10/2019 | Jordan |
| 2019/0301497 A1 | 10/2019 | Jordan |

FOREIGN PATENT DOCUMENTS

| | | |
|---|---|---|
| TW | 201801969 | 1/2018 |
| TW | M562805 | 7/2018 |
| TW | M575784 | 3/2019 |

OTHER PUBLICATIONS

Fox Transfer Hydraulic Infinite Adjust Seat Post, information found online at https://www.ridefox.com/family.php?m=bike&family=seatpost.

KS Suspension LEV Intergra dropper post, information found online at https://www.kssuspension.com/product/lev-integral.

9point8 the Fall Line dropper post, information found online at https://www.9point8.ca/index.php?route=product/product&path=42&product_id=213.

Third party prior art submission made to German patent office on Feb. 9, 2022 regarding related German application No. 10 2020 109 014.5, including copies of references i) TW 1562922, ii).

Notice of third party opinion art submission made to TW IPO dated Sept 1, 2021 in related ROC (Taiwan) Pat Appln No. 109111138.

Translation of Office action dated Mar. 3, 2022 in related ROC (Taiwan) Pat. Appln. No. 109111138.

Translation of Office action dated Nov. 17, 2021 in related ROC (Taiwan) Pat. Appln. No. 109111138.

Third Party Submission of Prior Art on Jan. 28, 2002 in related Canadian application No. 3,077,761.

Webpage entitled "Model: 2017 LEV/LEV 272" showing product specifications and figures of a bicycle seat tube provided by Kind Shock Hi-Tech Co., LTD. and downloadable from the Wayback Machine at https://web.archive.org/web/20170610095807/kssuspension.com/wp-content/uploads/2016/12/2017-Lev-drawing.pdf, available at least as early as Jun. 10, 2017.

Webpage entitled "Model: LEV 272" showing an exploded view of a bicycle seat tube provided by Kind Shock Hi-Tech Co , LTD. and downloadable from the Wayback Machine at https://web.archive.org/web/20170629100108/http://kssuspension.com/wp-content/uploads/2015/12/LEV-272.PDF, available at least as early as Jun. 10, 2017.

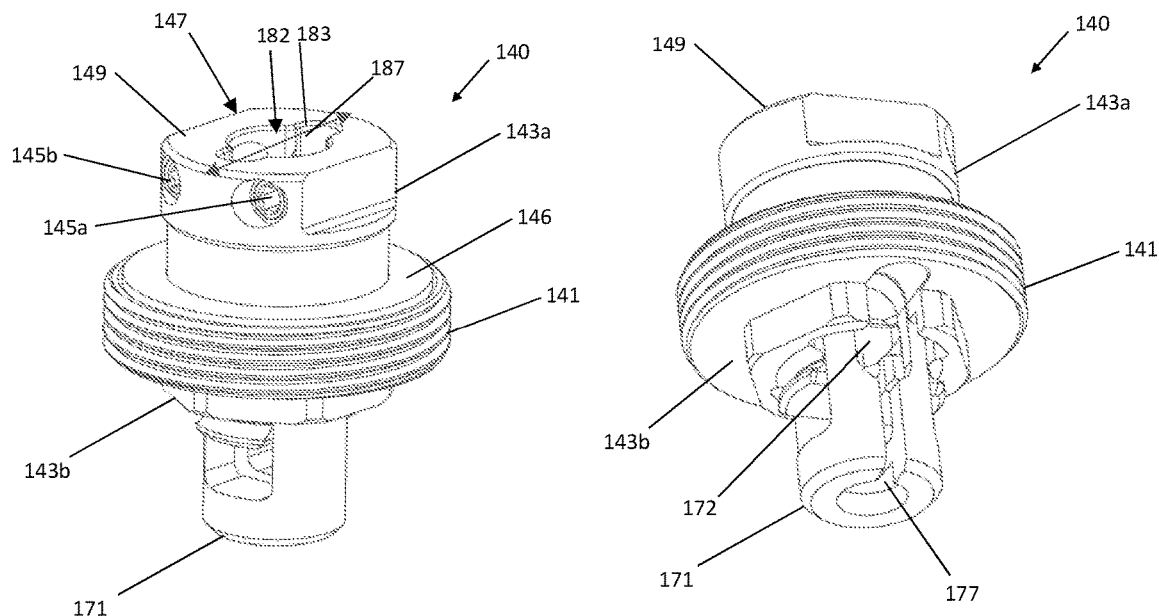
FIG 7.   FIG 8.
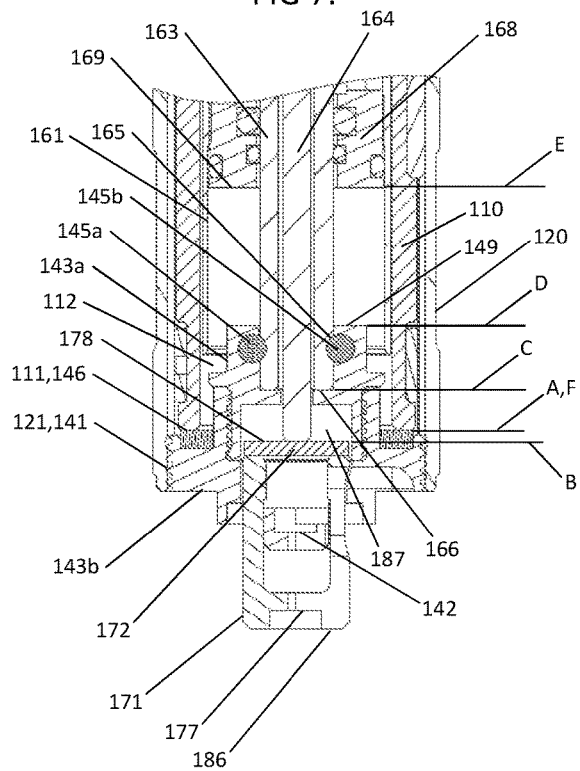   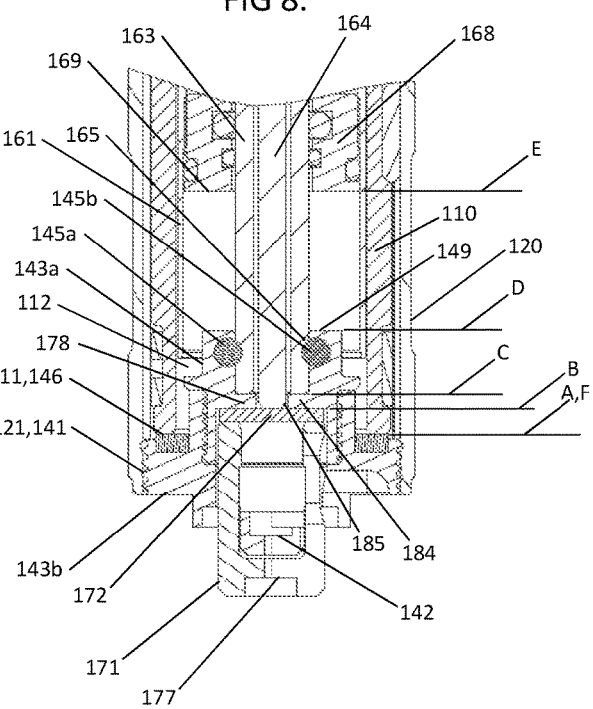
FIG 9.   FIG 10.

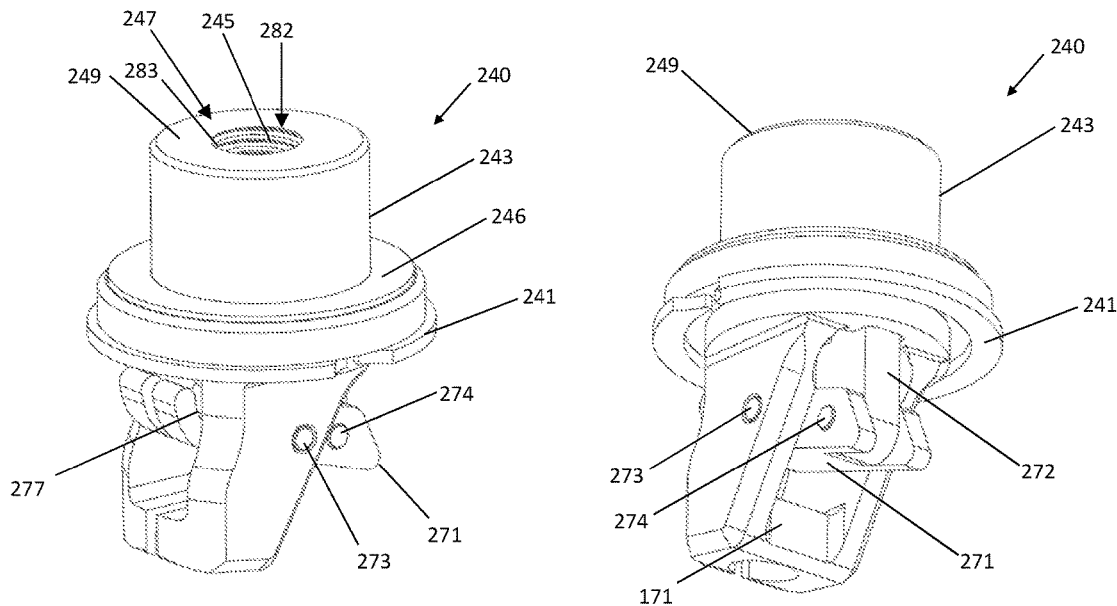
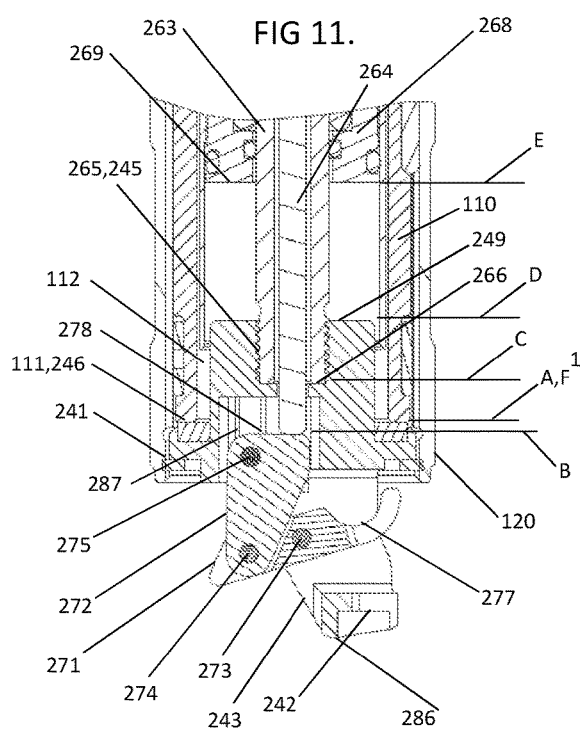
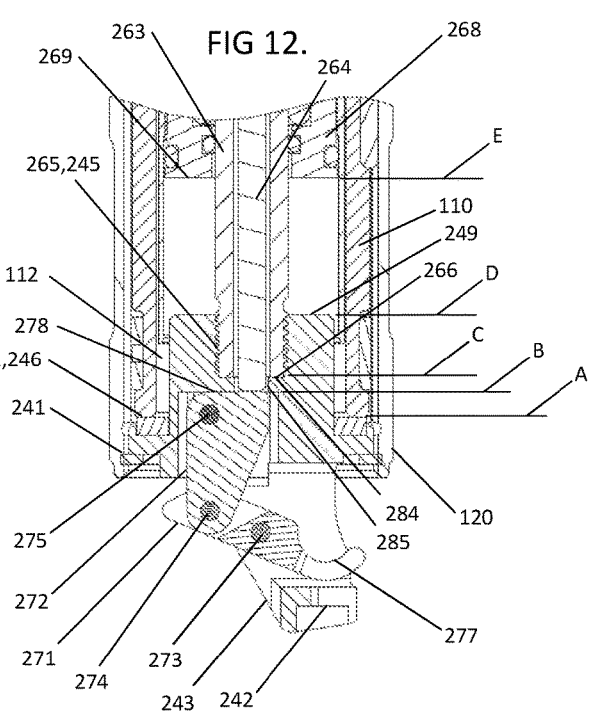
FIG 13.
FIG 14.

DROPPER POST ASSEMBLY FOR A BICYCLE

CROSS-REFERENCE TO RELATED APPLICATIONS

The present application is a continuation of U.S. Ser. No. 16/837,722 which was filed Apr. 1, 2020 and which claims the benefit of and priority to U.S. provisional patent application No. 62/830,405 filed on Apr. 6, 2019, and U.S. patent application No. 62/839,594 filed on Apr. 26, 2019, the entirety of which are hereby incorporated by reference.

FIELD OF THE INVENTION

In one of its aspects, the present disclosure relates to a bicycle seat post assembly, and in particular to a dropper post assembly for a bicycle and an actuator assembly for controlling the internal spring/mechanism of the dropper seat post.

INTRODUCTION

Adjustable bicycle seat posts can provide a variety of seat height options to riders. To enable riders to adjust the height of their seat post while riding, so-called "dropper" seat posts have been developed. Dropper seat posts are telescopic posts that allow the rider to change the height of their seat without having to stop and manually adjust the mechanically tightened seat post collar. A typical dropper seat post allows a rider to extend and retract a portion of their seat post while in motion to provide a high and low seat position, respectively.

Taiwan patent publication no. TW201801969 discloses a casing gap filling structure for a bicycle seat tube, which comprises a casing set having an outer tube and an inner tube which are sleeved onto each other and move linearly. A rotation constraining set is arranged between the inner tube and the outer tube and is provided with a first constraining groove arranged on the inner diameter edge of the outer tube and a second constraining groove arranged on an outer diameter edge of the inner tube. The first and second constraining grooves form a constraining space together, and at least one constraining member made of a metal material is accommodated in the constraining space and capable of conducting synchronous linear displacement with the inner tube. A gap filler set is disposed in the constraining space and provided with at least one constraining member made of a plastic material. The gap filler set and the metal constraining member respectively overlap with each other in the constraining space along the axial direction of the inner and outer tubes, and the plastic constraining member fills the constraining space so as to eliminate the gaps among the plastic constraining member and the first and second constraining grooves. In this way, the rotation constraining set and the gap filler set are used to achieve the dual function of constraining the rotation and eliminating the gaps between the inner tube and the outer tube at the same time. The manufacturing cost of the filling structure is low because the overall components are simple and easy to be assembled quickly. Further, the gaps among the components generated by the fit tolerance and the manufacturing tolerance are reduced with no requirement of tight rotation actions. The automatic filling function is thus achieved and compatible with the lifting seat tube and the suspension seat tube.

U.S. Pat. No. 9,688,331 discloses a bicycle seat post assembly, which includes first and second tubes that are telescopically arranged, a fluid chamber that includes a compressible fluid to generate a force to expand the first and second tubes relative to each other, and a positioning structure. The positioning structure includes a support member on one of the first tube and the second tube, a positioning member that pivots about an axis between a first position and a second position, a control unit, which is connected to the positioning member to move the positioning member between the first position and the second position, and a position maintaining member, which is provided on the other of the first tube and the second tube. The position maintaining member includes an engaging portion that engages with the positioning member to maintain a positional relationship between the first and second tubes.

U.S. Pat. No. 8,079,772 discloses an adjustable height seat post for bicycles that comprises an inner tube slidably contained within an outer tube which supports a bicycle seat. The outer tube clamps into a bicycle frame and contains a spring which acts to force the inner tube upward. The inner tube is allowed longitudinal movement within the fixed outer tube via a locking mechanism that forces ball bearings into pockets or channels on the inner tube. The locking mechanism can be remotely activated with a handlebar mounted lever or manually with a seat post mounted lever.

US patent publication no. 2015/0232158 discloses a bicycle seat post assembly that includes a first cylinder, a second cylinder, and a positioning structure. The second cylinder is configured to be telescopically received in the first cylinder. The positioning structure is configured to relatively position the first cylinder and the second cylinder. The positioning structure is configured to switch a state of the bicycle seat post assembly among a first adjustable state and a second adjustable state. In the first adjustable state, a positional relationship between the first cylinder and the second cylinder is continuously adjustable within a first adjustable position range. In the second adjustable state, the positional relationship between the first cylinder and the second cylinder is continuously adjustable within a second adjustable position range different from the first adjustable position range.

SUMMARY

In recent years, "dropper" seat posts have become more desirable. It is advantageous to lower a bicycle seat as far as possible when riding through technical terrain to allow the rider to change their body position or bend their knees deeply without contacting the seat.

Shorter riders are often required to use shorter travel dropper posts to reduce the overall length because there is less distance between an insertion limiting feature of the seat tube and the rails of the bicycle seat when at their preferred seat height. This distance relates to the total length of the dropper post.

It is typical for dropper posts to be sold in a variety of travel lengths. For example, a manufacturer may offer stock dropper post models with travel lengths that vary by 20 mm to 25 mm with each model (e.g., 125 mm travel, 150 mm travel, 170 mm travel, etc.).

Despite the advances made to date in the development of bicycle seat post assemblies, there is room for improvement to address the above-mentioned problems and shortcomings of the prior art.

In accordance with one broad aspect of the teachings described herein, a dropper post assembly for supporting a bicycle seat may include an outer tube extending along a post axis between a lower end and an upper end. An inner tube may be telescopically receivable in the outer tube and may have an upper end that is connectable to a bicycle seat and a lower end that is disposed within the outer tube. The lower end may have a lower end surface defining a lower plane that is substantially orthogonal to the post axis and intersects a lowermost portion of the lower end surface. The inner tube may be axially slidable within the outer tube between a retracted position in which the lower end of the inner tube is proximate the lower end of the outer tube and an extended position in which the lower end of the inner tube is axially spaced from the lower end of the outer tube. An actuator assembly may include an actuator body having a mounting portion connected to the lower end of the outer tube, a cartridge rod receiving portion having a cavity extending axially from an upper surface and configured to receive a cartridge rod containing a translatable actuation rod, and an actuating mechanism movably connected to the actuator body and configured to selectably translate the actuation rod when in use. The actuator assembly may be configured so that when the inner tube is in the retracted position at least the upper surface of the cartridge rod receiving portion is nested within the inner tube and is above the lower plane.

The actuator body may include an axially extending channel that is configured to movably receive the actuating mechanism and is bounded by an upper end wall having a rod aperture that is sized to receive the actuation rod. When the inner tube is in the retracted position the upper end wall and at least a portion of the channel may be disposed within the inner tube and above the lower plane.

The actuating mechanism may include an engagement member that is movable within the channel and that includes an actuation rod contact surface configured to bear against a lower end of the actuation rod when in use. While the inner tube is in the retracted position the engagement member may be movable relative to the actuator body between a lower position in which the actuation rod contact surface is below the lower plane and an upper position in which the actuation rod contact surface is within the inner tube, above the upper plane and proximate the upper end wall of the channel.

The entire engagement member may be disposed laterally inboard of/within the inner tube.

The actuator assembly further may include a tube stop surface upon which the lower end surface rests when the inner tube is in the retracted position, and the upper end wall may be spaced axially above the tube stop surface.

The mounting portion may have a first diameter sized to engage the outer tube and an insertable portion of the actuator body may be disposed above the mounting portion and may have a second smaller diameter and is sized to be nested within the inner tube. The insertable portion may include the cartridge rod receiving portion, the upper end wall and at least a portion of the channel.

The actuator body may have a length in the axial direction between an axially uppermost and axially lowermost surfaces, and when the inner tube is in the retracted position at least 10% of the length of the actuator body may be nested within the inner tube, or when the inner tube is in the retracted position at least 20% or at least 30% of the length of the actuator body may be nested within the inner tube.

The actuator assembly may be separable from the outer tube via a single operation when the mounting portion is disconnected from the outer tube.

The mounting portion may include a threaded portion that threadingly engages corresponding threads on an inner surface of the outer tube. The actuator assembly may be removable from the outer tube in a single operation by unthreading the threaded portion from the outer tube.

The actuator body may be of integrally formed, one-piece construction.

The cavity of the cartridge rod receiving portion may have a laterally extending lower end wall for abutting a lower end of the cartridge rod. When the inner tube is in the retracted position the lower end wall may be nested within the inner tube.

When the inner tube is in the retracted position the lower end wall may be disposed above the lower plane by least about 2 mm.

The dropper post assembly may include a locking spring cartridge having a cartridge outer tube disposed within and movable with the inner tube, a cartridge rod extending from the cartridge outer tube to a lower end that is received within the cartridge rod receiving portion of the actuator assembly and an actuation rod translatable within the cartridge rod to trigger the locking spring cartridge. When the inner tube is in the retracted position the lower end of the cartridge rod may be disposed within the inner tube and above the lower plane.

The lower end of the cartridge rod may have an end surface that is spaced above the lower plane by about 2 mm when the inner tube is in the retracted position.

The cavity of the cartridge rod receiving portion may extend from the upper surface to a lower end wall that is spaced axially from the upper surface and comprises an aperture through which the actuation rod is translatable when in use, and wherein the actuator assembly configured so that when the inner tube is in the retracted position the lower end wall of the cartridge rod receiving portion is nested within the inner tube and is above the lower plane In accordance with another broad aspect of the teachings described herein, a dropper post assembly for supporting a bicycle seat may include an outer tube extending along a post axis between a lower end and an upper end. An inner tube may be telescopically receivable in the outer tube and may have an upper end including an upper travel edge defining an upper plane and a lower end that is disposed within the outer tube and comprising a lower end surface defining a lower plane. The inner tube may be axially slidable within the outer tube between a retracted position in which the lower end of the inner tube is proximate the lower end of the outer tube and the lower plane is coplanar with a retraction plane, and an extended position in which the lower end of the inner tube is axially spaced from the retraction plane by a drop length, a travel portion of the inner tube is exposed outside the outer tube and a lower portion of the inner tube remains axially overlapped within the lower tube defining an overlap length. A seat clamp assembly may be connected to the upper end of the inner tube and may include first and second clamping channels configured to retain first and second bicycle seat rails when in use. The first and second clamping channels may extend along respective first and second channel axes that lie in a common rail plane that intersects the post axis at a head point. A distance between the head point and the upper plane may define a head length. An actuator assembly may be at the lower end of the outer tube and may include an actuator body having an axially uppermost surface that is disposed above the retraction plane and an opposing axially lowermost surface that is spaced below the retraction plane by an effective actuator length. The actuator assembly may be configured so that at least the axially uppermost surface is nested within the lower end of the inner tube and above the lower plane when the inner tube is in the retracted position whereby a sum of the overlap length, the head length and the effective actuator length defines a normalized post length that is less than about 160 mm.

The normalized post length may be less than about 140 mm.

The drop length may be between about 150 mm and about 240 mm.

A sum of the overlap length, the head length, the effective actuator length and two times the drop length may defines a total post length that is between 400 mm and about 585 mm.

The overlap length may be at least 80 mm.

The head length may be less than about 40 mm.

The effective actuator length may be less than 40 mm.

The actuator body may include: a mounting portion connected to the lower end of the outer tube; a cartridge rod receiving portion configured to receive a cartridge rod containing the translatable actuation rod; and an actuating mechanism movably connected to the actuator body and configured to selectably translate an actuation rod when in use.

The cartridge rod receiving portion may include a cavity extending axially from an upper surface. The actuator assembly may be configured so that when the inner tube is in the retracted position at least the upper surface of the cartridge rod receiving portion is nested within the inner tube and is above the lower plane.

The head length may be less than the effective actuator length.

The actuator assembly may be separable from the outer tube via a single operation when the mounting portion is disconnected from the outer tube.

The actuator body may have a length in the axial direction between the axially uppermost and axially lowermost surfaces. When the inner tube is in the retracted position at least 10% of the length of the actuator body may be nested within the inner tube.

When the inner tube is in the retracted position at least 20% or at least 30% of the length of the actuator body may be nested within the inner tube.

In accordance with yet another broad aspect of the teachings described herein, a dropper post assembly for supporting a bicycle seat may include an outer tube extending along a post axis between a lower end and an upper end. An inner tube may be telescopically receivable in the outer tube and may have an upper end including an upper travel edge defining an upper plane and a lower end that is disposed within the outer tube and comprising a lower end surface defining a lower plane. The inner tube may be axially slidable within the outer tube between a retracted position in which the lower end of the inner tube is proximate the lower end of the outer tube and the lower plane is coplanar with a retraction plane, and an extended position in which the lower end of the inner tube is axially spaced from the retraction plane by a drop length, a travel portion of the inner tube is exposed outside the outer tube and a lower portion of the inner tube remains axially overlapped within the lower tube defining an overlap length. A seat clamp assembly may be connected to the upper end of the inner tube and may include first and second clamping channels configured to retain first and second bicycle seat rails when in use. The first and second clamping channels may extend along respective first and second channel axes that lie in a common rail plane that intersects the post axis at a head point. A distance between the head point and the upper plane may define a head length. An actuator assembly may be at the lower end of the outer tube and may include an actuator body having an axially uppermost surface and an opposing axially lower most surface that is spaced below the retraction plane by an effective actuator length. The dropper post assembly may be configured so that a sum of the overlap length, the head length and the effective actuator length defines a normalized post length that is less than about 140 mm.

The lower end of the inner tube may include a lower end surface defining an lower plane and wherein the axially upper most surface of the actuator body is disposed above the retraction plane and the actuator body may be configured so that at least the axially uppermost surface is nested within the lower end of the inner tube and above the lower plane when the inner tube is in the retracted position.

The actuator body may also include: a mounting portion connected to the lower end of the outer tube; a cartridge rod receiving portion configured to receive a cartridge rod containing the translatable actuation rod; and an actuating mechanism movably connected to the actuator body and configured to selectably translate an actuation rod when in use.

The cartridge rod receiving portion may include a cavity extending axially from an upper surface. The actuator assembly may be configured so that when the inner tube is in the retracted position at least the upper surface of the cartridge rod receiving portion is nested within the inner tube and is above the lower plane.

The normalized post length may be less than about 140 mm.

The drop length may be between about 150 mm and about 240 mm.

A sum of the overlap length, the head length, the effective actuator length and two times the drop length defines a total post length that may be between 400 mm and about 585 mm.

The overlap length may be at least 80 mm.

The head length may be less than about 40 mm

The effective actuator length may be less than 40 mm.

The actuator body may have a length in the axial direction between the axially uppermost and axially lowermost surfaces. When the inner tube is in the retracted position at least 10% of the length of the actuator body may be nested within the inner tube.

When the inner tube is in the retracted position at least 20% or at least 30% of the length of the actuator body may be nested within the inner tube.

The actuator assembly may be separable from the outer tube via a single operation when the mounting portion is disconnected from the outer tube.

The mounting portion may include a threaded portion that threadingly engages corresponding threads on an inner surface of the outer tube. The actuator assembly may be separable from the outer tube in a single operation by unthreading the threaded portion from the outer tube.

Thus, the present inventors have developed a dropper post assembly having a relatively shorter normalized post length, and a new design for an actuator assembly that can help facilitate the desired arrangement between the actuator and inner tube while the dropper post assembly is in use. This may help provide a dropper post assembly with a smaller overall length which may allow a dropper post to be used in variety of differently configured bicycle frames. This may also help provide a dropper post assembly having a desired amount of travel/drop while requiring less space/length than a conventional dropper post when in the retracted position and/or while still providing a post with a desired degree of stability in the extended position. This may help riders to better customize the maximum available drop of their seat post to their height, bicycle frame size, and/or saddle height requirements. To the knowledge of the inventors, a dropper post assembly with such a combination of features is heretofore unknown. Other advantages may become apparent to those of skill in the art upon reviewing the present description.

BRIEF DESCRIPTION OF THE DRAWINGS

Embodiments of the present invention will be described with reference to the accompanying drawings, wherein like reference numerals denote like parts, and in which:

FIG. 7 is a upper perspective view of one example of an actuator assembly;

FIG. 8 is a lower perspective view of the actuator assembly of FIG. 7;

FIG. 9 is an enlarged view of a lower portion of a dropper post assembly including the actuator assembly of FIG. 7 in a first state;

FIG. 10 is an enlarged view of a lower portion of a dropper post assembly including the actuator assembly of FIG. 7 in a second state;

FIG. 11 is a upper perspective view of another example of an actuator assembly;

FIG. 12 is a lower perspective view of the actuator assembly of FIG. 11;

FIG. 13 is an enlarged view of a lower portion of a dropper post assembly including the actuator assembly of FIG. 11 in a first state; and FIG. 14 is an enlarged view of a lower portion of a dropper post assembly including the actuator assembly of FIG. 11 in a second.

DETAILED DESCRIPTION

Figure 1:
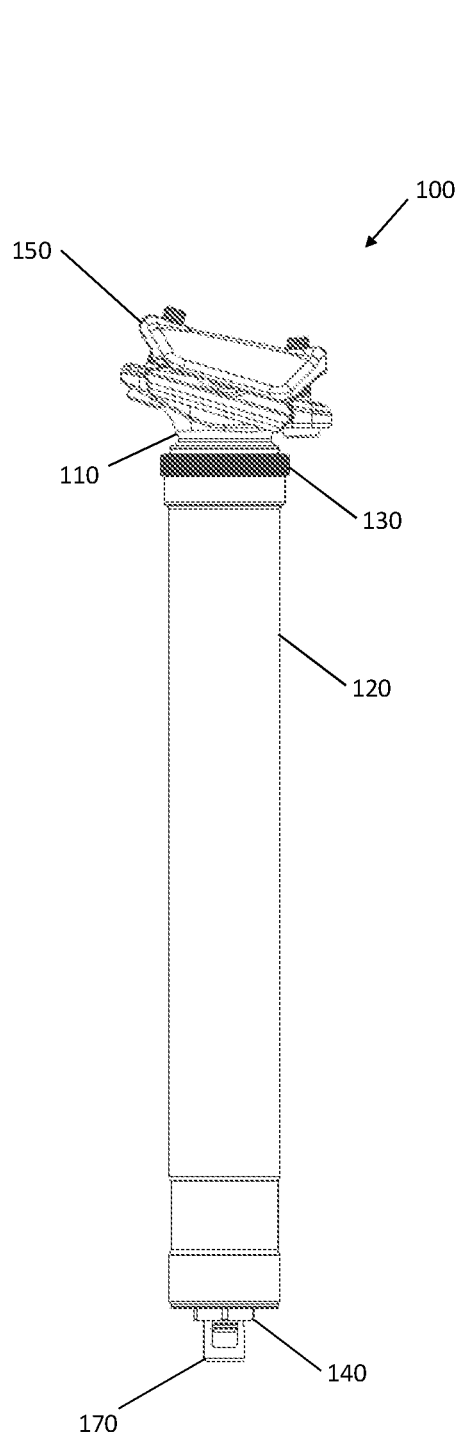
FIG. 1 is a side view of one example of a dropper post assembly in a retracted configuration.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim, or dedicate to the public any such invention by its disclosure in this document.

Bicycle dropper seat posts allow a rider to change the height of their seat while riding without having to stop and adjust a mechanically tightened seat post collar. Dropper seat posts are available in different sizes, having different lengths of travel/drop and different minimum and maximum seat heights. It may be generally desirable to provide a relative high travel/drop length while still having a dropper post assembly that feels stable and comfortable to a rider and that can fit within the space available within the bicycle frame. This can be related to the total length of the dropper post assembly in its extended and retracted positions, and can be understood to be the sum of the upper and lower travel/drop distances (i.e., the vertical travel distance of the post), along with an overlap length (i.e., the length of the inner tube that remains nested within the outer tube when in its extended configuration to help provide stability), a head length (i.e., the distance from the top of the seat tube to the position of the seat rails when mounted to the seat attachment assembly) and an effective actuator length (e.g a length by which portions of the actuator extend axially beyond the lower surface of the inner tube). Together, these lengths can define a total length of the dropper post assembly.

When retracted, the inner tube can be substantially nested within the outer/lower tube but the head length, overlap length and effective actuator length remain unchanged (i.e. are nor reduced or nested, etc. when the post is retracted). Therefore, the sum of these generally fixed lengths (the head length, the effective actuator length and the overlap length) can define a normalized post length that can, in some examples, represent a limit on how low the bicycle seat can be positioned using a given dropper post assembly while still providing the desired degree of travel. Reducing this normalized post length may help accommodate a wider variety of different riders using a given dropper post.

Shortening or reducing the normalized post length may be done by shortening one or more of the head length, overlap length and the effective actuator length. One way of shortening the head length is to use a suitable attachment assembly, such as, for example, the seat attachment assembly made and sold by OneUp Components of British Columbia, Canada and as described in U.S. Pat. Nos. 10,370,051 and 10,583,882 the teachings of which are incorporated herein by reference. Another option is to shorten the degree of overlap between the inner and outer tubes when in the extended position, there by shortening the overlap length. However, reducing the overlap length can reduce the stability of the inner tube and allow more tilting of the inner post while in use. This may reduce rider comfort and/or safety, and/or may contribute to wear of the dropper post assembly. Preferably, the normalized post length can be reduced while maintaining a desirable overlap length.

In conventional dropper post designs a relatively significant amount of the overall length comes from the portions of the dropper actuator assembly that extend below the lower end of the outer tube. The actuator assembly includes mechanisms that can be triggered, either manually or through a remote mechanism like a cable or hydraulic connection, to activate an internal cartridge or other biasing mechanism that can cause the desired movement of the inner tube. In many conventional designs the actuator assembly is connected to the bottom end of the outer tube and extends completely, or least substantially completely below the lower end of the outer tube. Positioning conventional actuator assemblies further within the outer tube may lead to interference between the actuator assembly and the inner tube and/or cartridge apparatus which could limit the amount of travel/drop of the post. The teachings described herein are generally related to a new dropper post assembly that can provide a desired travel/drop length while having a relatively small, and optionally minimized normalized post length, and to an improved actuator assembly that can be used to help reduce the effective actuator length (optionally while still having an overall actuator length that is comparable to conventional actuator assemblies).

Figure 2:
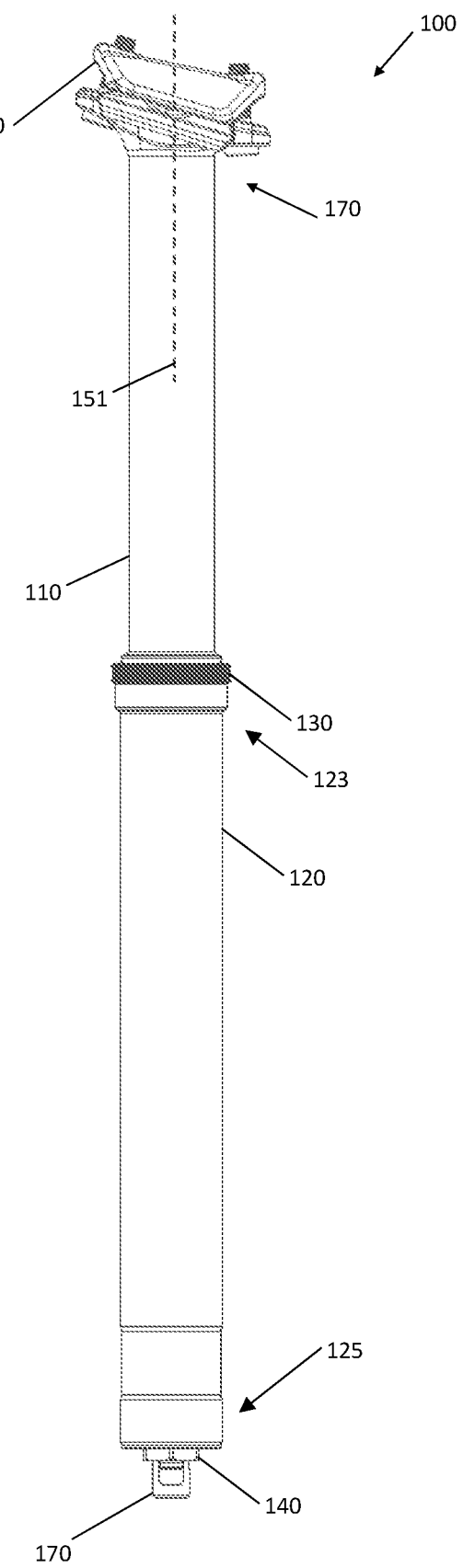
FIG. 2 is the dropper post assembly of FIG. 1 in an extended configuration.

Referring to FIGS. 1-4, one example of a seat post assembly 100 includes an upper or inner tube 110, a lower or outer tube 120, a collar assembly 130 (that can include any suitable seals, bushings and the like) an actuator assembly 140 having an actuating mechanism 170 and one example of a seat clamp assembly 150. FIG. 1 shows this assembly 100 with the inner tube 110 in its retracted position and FIG. 2 shows the inner tube 110 in its extended position.

Figure 4:
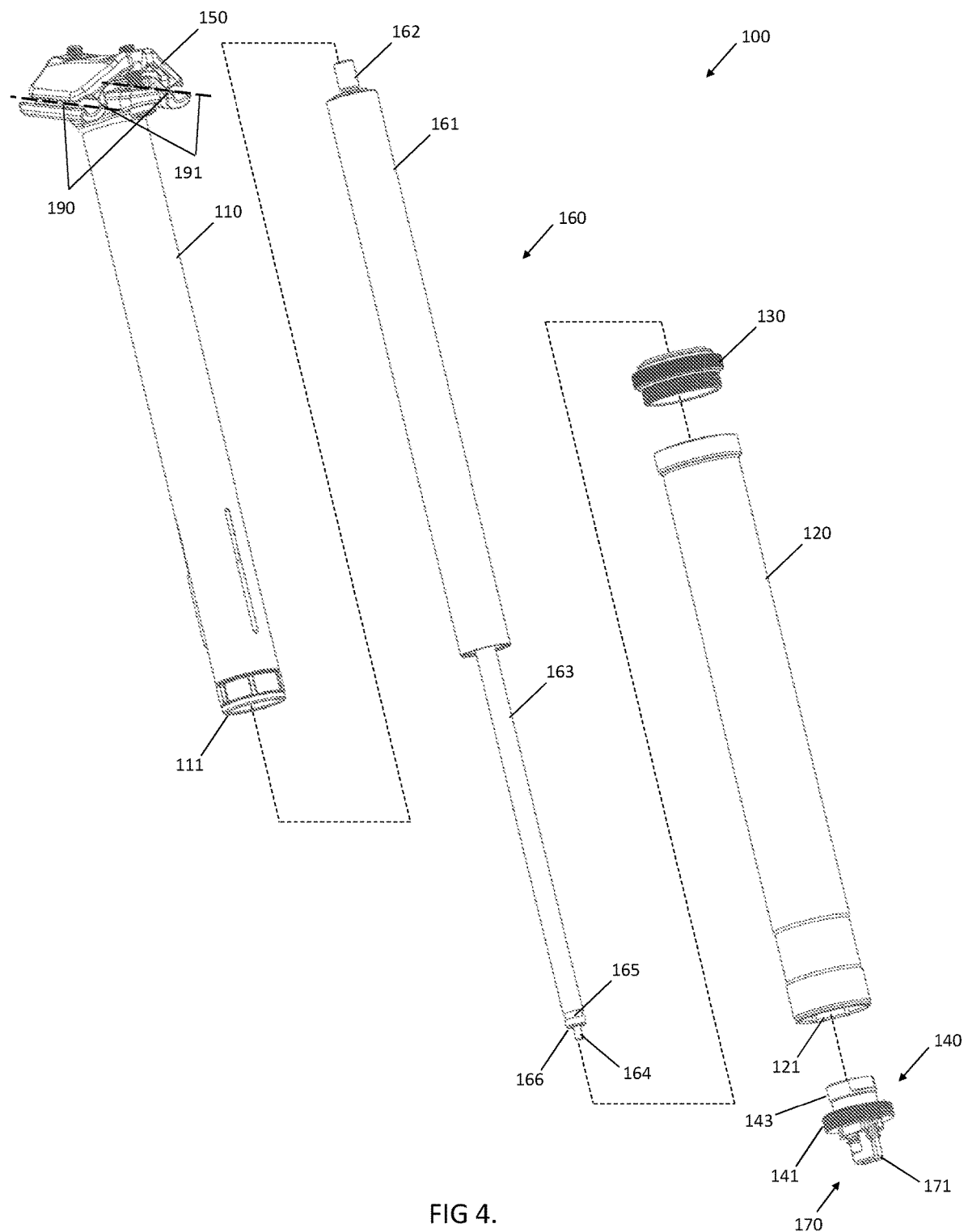
FIG. 4 is a partially exploded view of the dropper post assembly of FIG. 1.

Any suitable biasing/driving member can be provided inside the assembly to help move the inner tube 110, and in this example the assembly 100 includes a locking spring cartridge 160 (FIG. 4). This locking spring cartridge 160 includes a cartridge outer tube 161, an upper connection portion 162 for attaching cartridge 160 to upper tube 110, a cartridge rod 163, a rod attaching portion 165 which in this example includes a locking groove and a actuation rod 164 that can translate within the cartridge rod 163 to unlock the locking spring cartridge 160 when triggered by the actuating mechanism 170. For example, when the dropper post assembly 100 is in use the actuating mechanism 170 may push or pull the actuation rod 164 to open a valve (not shown) within the cartridge 160 or to otherwise unlock the cartridge 160. Once unlocked, relative axial movement between the inner tube 110 and the outer tube 120 is also possible. When the actuating mechanism 170 is relaxed/disengaged the cartridge 160 can re-lock and relative motion between the inner tube 110 and outer tuber 120 can be inhibited. Referring also to FIGS. 9 and 10, in this example the rod end cap 168 of cartridge 160 is also visible in the section views and is fixedly engaged with cartridge outer tube 161. A lower most surface 166 of the cartridge rod 163 lies in and defines a plane C. Cartridge rod 163 slides axially through rod end cap 168 when cartridge 160 is unlocked. Rod end cap 168 also has a lower end cap surface 169, which lies in defines a plane E.

The cartridge outer tube 161 is shown as a separate housing in this example, but in other examples the cartridge outer tube and the upper tube 110 may be integrally formed with each other, and in such instances the upper connection portion 162 may not be required. While one example of a locking spring cartridge 160 is described for convenience, the improved actuator assembly and other aspects of the teachings described herein may be used in combination with other, suitable biasing cartridges or mechanisms.

Figure 3:
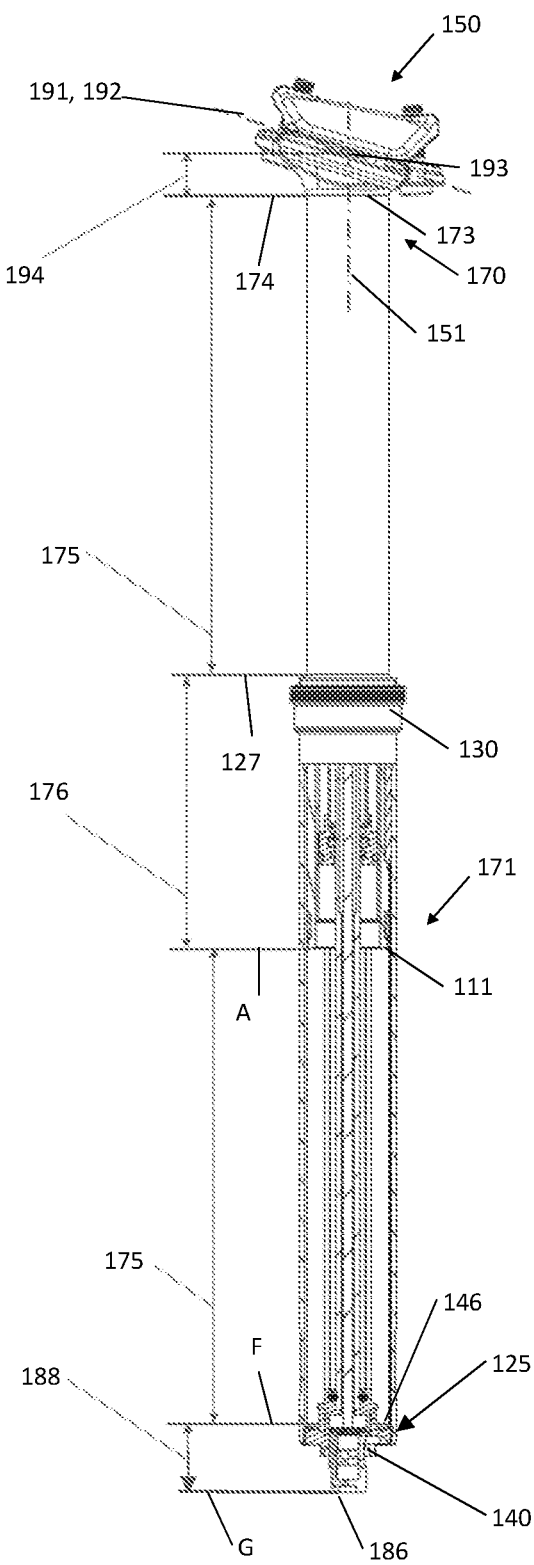
FIG. 3 is a partial cross-sectional view of the dropper post assembly of FIG. 2.

The outer tube 120 is, in this example, an elongate, hollow tubular member that extends along a post axis 151 between a lower end 123 and an upper end 125. The upper end 125 as described herein can include an upper end face of the outer tube 120 itself and can also refer to the collar 130 and other seals, bushings and such features provided toward the upper end 125 of the outer tube 120 that remain generally fixed with the outer tube 120 when the inner tube 110 moves. For example, the collar 130 acts as a cap on the upper end of the outer tube 120. In the illustrated example, the collar 130 has threads that are configured to engage threads on the upper end of the outer tube 120. Unthreading the collar 130 can allow a user to access interior of the assembly 100 for maintenance and inspection. As shown in FIG. 3, the upper edges of the collar 130 (or other uppermost, fixed feature) can define a reference plane 127 that can be considered to define the upper limit of the outer tube 120 for the purposes of the discussion herein.

Referring to FIGS. 2 and 3, in this example the inner tube 110 is a generally, elongate tube having an upper end 170 and an opposing lower end 171 that are spaced apart from each other in the direction of a post axis 151.

The lower end 171 has a lower end surface 111 that lies in and helps define a lower plane A that is also substantially orthogonal to the post axis 151. In the illustrated example the lower end surface 111 is substantially planar and therefore lies within the orthogonal plane A. In other examples the lower end surface need not be planar or arranged in the transverse direction as shown. In such examples plane A can be defined as a plane that is substantially orthogonal to the post axis 151 and that intersects the lowermost portion of the lower end surface of the inner tube 110 (or structures attached to and movable therewith as described herein). The plane A is intended to represent the elevation of the lowermost portion of the movable, inner tube 110 that would be the portion most likely to contact an obstruction or object that was located within the outer tube 120 and in the travel path of the inner tube 110. That is, the plane A can still be applied to structures and used as a reference point as described herein even when an embodiment of the assembly 100 has variations in the shape and configuration of the lower end of the inner tube 110. An axial distance between the upper plane 174 and lower plane A can define an inner post length that can be between about 175 mm and about 330 mm. The inner post length remains fixed while the dropper post assembly 100 is in use.

While the lower end 171 of the inner tube 110 is shown as simply being an integral part of the tube 110 it may alternatively, in other embodiments, include some additional pieces or members that can be attached to the tube and may have slightly different shapes or configurations—but which are attached to and move with the inner tube 110 as it moves between extended and retracted positions. For the purposes of the discussion herein, the plane A is intended to represent the plane containing the lower most, movable portion of the assembly 100 that translates with the inner tube 110 and would be likely to contact or interfere with objects positioned within the lower end of the outer tube 120. That is, while lower end surface 111 is shown as being a portion of the tube itself in this example, in other examples the lower end surface 111 may be provided by the lowermost portion of any such attachment or other member connected to the inner tube 110 and references to the lower end surface 111 and plane A are intended to cover such arrangements.

The upper end 170 of the inner tube 110 can, like the upper end of the outer tube 120, include a variety of structures or other members (in addition to just a length of tube) such as attachment apparatus for connecting to and supporting the seat clamp assembly 150. Some of these features may extend into the or beyond the upper end of the inner tube 110 and are translatable with the inner tube 110 as it moves. For the purposes of the discussion herein the portion of the inner tube 110 that telescopes within the lower tube 120 (e.g. is at or below plane 127 when the inner tube 110 is retracted) can be considered to be the travel or drop portion of the inner tube 110. The upper edge of the travel portion of the inner tube can include an upper travel edge 173 that can be an end surface of the inner tube 110 itself, a location along the edge or sidewall of the inner tube 110 and/or a portion or surface on another component mounted to the inner tube 110. For the purposes of the discussion herein, this upper travel edge 173 can be considered to lie in and helps define an upper plane 174 that is generally orthogonal to the post axis 151. When the inner tube 110 is retracted the upper plane 174 may be substantially coplanar with plane 127, and when the inner tube 110 is extended the upper plane 174 is spaced from the plane 127 by the drop length 175 (FIG. 3 and described further herein). The upper end 170 is also configured to be connected to a suitable seat clamp assembly 150.

Figure 5:
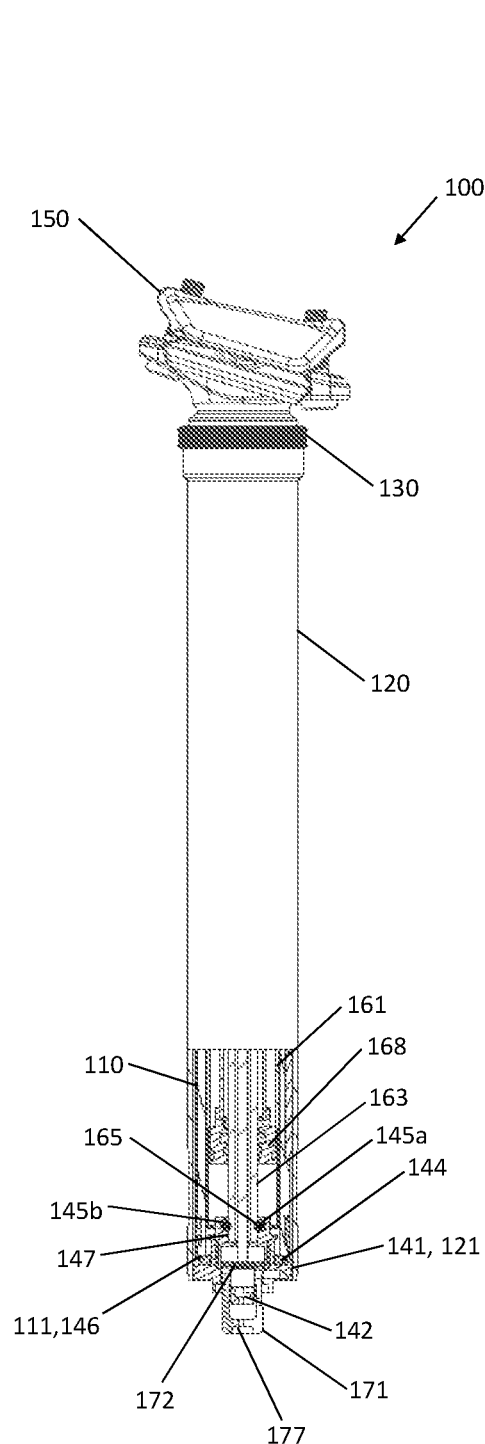
FIG. 5 is a partial cross-sectional view of the dropper post assembly of FIG. 1.

When the inner tube 110 is in the retracted position (FIGS. 1 and 5) the sidewall of the inner tube 110 is almost entirely received within the outer tube 120 and the lower end surface 111 can reach its lowermost, or fully retracted position, such that further retraction of the inner tube 111 is inhibited. In the illustrated example, movement of the inner tube 110 is stopped when the lower end surface 111 contacts and bears against a tube stop surface 146 which is also at the lower end of the outer tube 120. The tube stop surface 146 can be any suitable surface and is, in this example provided by a gasket member that is supported on the actuator assembly 140. Alternatively, the tube stop surface may be integrally formed with the actuator assembly 140, may be provided as part of the outer tube 120 or may be provided as a separate member. Optionally, instead of being positioned at the lower end of the outer tube 120 to contact the lower end surface 111, other embodiments of the tube stop surface may be provided in other locations within the assembly 100 and may contact other portions of the inner tube 110 or other suitable structure in order to help stop the inward translation of the inner tube 110. That is, the tube stop surface need not contact the lower end surface 111 as shown, and instead may contact another portion of the inner tube 110 (for example, toward the upper end of the inner tube).

Regardless of the configuration of the tube stop surface and/or which portion of the inner tube 110 it contacts, the location of the plane A when the inner tube 110 is in its fully retracted defines the position of a retraction plane F (FIG. 3). That is, when the inner tube 110 is fully retracted, as shown in FIGS. 9 and 10, the plane A and F are coplanar, and when the inner tube 110 is extended as shown in FIG. 3, plane A can be located at the lower end surface 111 and is spaced from plane F.

Figure 6:
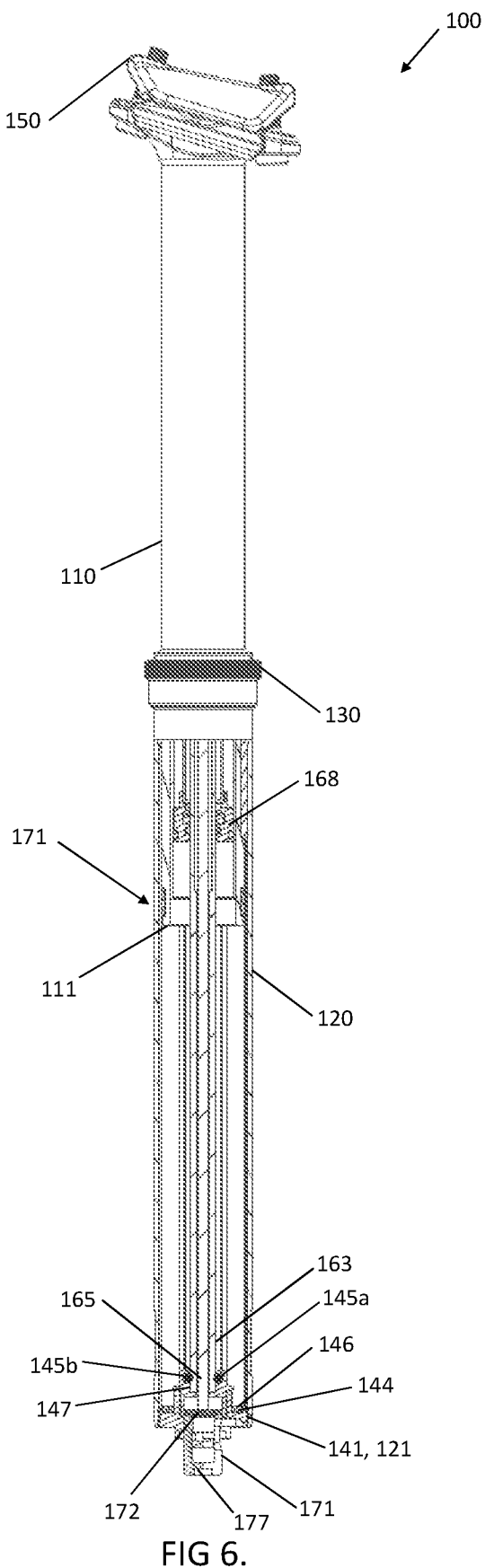
FIG. 6 is a partial cross-sectional view of the dropper post assembly of FIG. 2.

When the inner tube 110 is in the extended position (FIGS. 2, 3 and 6) the lower end surface 111 is axially spaced apart from the tube stop surface 146 by a distance 175 that is the travel/drop length for the dropper post assembly 100. In this position an upper, travel portion of the inner tube 110 is exposed above the outer tube 120 by the same distance 175 (shown as the distance between planes 127 and 174), which represents the change in height of the bicycle seat when the dropper post assembly 100 is activated. This drop length 175 can vary with differently sized/configured examples of the assembly 100, but may be between about 80 mm and about 260 mm, between about 110 mm and about and 250 mm and preferably may be between about 150 mm and about 240 mm.

To help keep the inner tube 110 stable a lower portion of the inner tube 110 remains nested within the lower tube 120 and/or collar 130 (e.g. below plane 127) when the inner tube 110 is extended. This nested portion of the inner tube 110 defines an overlap length 176 that is shown in this example as being the axial distance between planes A and 127 (e.g. the non-exposed portion of the inner tube 110). The overlap length can vary with differently sized/configured examples of the assembly 100, but may be between at least 60 mm and 120 mm and may be between about 70 mm and about 110 mm, and preferably may be at least about 80 mm. In general, increasing the overlap length 176 may help increase the stability of the inner tube 110 when extended, which may reduce wear and/or increase rider comfort.

Referring also to FIGS. 7-10 the actuator assembly 140 has an actuator body 143 that in this example is formed from two individual parts 143*a* and 143*b* that are joined together so that when in use with the assembly 100 the body behaves as a single piece, and can be attached and detached from the lower tube 120 as a single unit—without having to separate parts 143*a* and 143*b*. Alternatively, the body 143 may be formed of more than two parts or may be of integral, one piece construction (as described herein)

The body 143 includes a mounting portion 141 which in this example includes external threads that extend around the perimeter of the body 143. The threads of the mounting portion 141 can engage complementary threads 121 on an inner surface of the outer tube 120. In this arrangement the actuator assembly 140 is separable from the outer tube via a single operation (e.g. unthreading) and in one piece (e.g. without requiring disassembly) when the mounting portion 141 is disconnected from the outer tube 120. In other examples, the mounting portion 141 may include any type of apparatus that can engage with a complementary portion of the outer tube 120 or other suitable member, and may include fasteners, circlips, clips, a press fit, deformation fit or the like. The region of the body 143 that is above the mounting portion 141 has, in this example been configured to provide a shoulder to accommodate and support a cushioning member 144 (FIG. 5) which serves as the upwardly facing tube stop surface 146. In this arrangement, the tube stop surface 146 is removable from the lower tube 120 with the actuator assembly 140.

The actuator body 143 also includes a cartridge rod receiving portion 147 that is configured to attach the cartridge rod 163 to the actuator body 143. The cartridge rod receiving portion 147 may have any configuration that is suitable for attaching to a given cartridge rod 163 that is used in the assembly 100. In this example the cartridge rod receiving portion 147 includes an axially oriented cavity 182 that extends from an aperture 183 that is provided in an upper end surface 149 of the body portion which, in this example includes the upper most surface of the actuator assembly 140. The aperture 183 is sized to accommodate the end of the cartridge rod 163. The cavity 182 extends to an opposing lower end wall 184 that includes a rod aperture 185, which is sized to allow the tip of the actuation rod 164 to pass through. The cartridge rod 163 can be coupled to the actuator body 143 using any suitable technique, and in this example is secured in place using fasteners in the form of bolts 145*a* and 145*b* which, when installed as shown interact with a locking groove 165 that is provided on the cartridge rod 163. Other methods, including threaded connections, press fit, deformation fit, clips, adhesives and the like may be used in other examples.

The actuator assembly 140 also includes the actuating mechanism 170 which includes, in this example a slidable plunger 171 having a dynamic cable stop surface 177 and that supports and drives an engagement member 172 in the form of a plate having an actuation rod contact surface 178 that bears against an opposing contact surface that is provided on the tip of the actuation rod 164. When the plunger 171 is extended, the plate 172 moves downwardly (as illustrated in FIG. 9) and the actuation rod 164 can also move down. This example of the actuator mechanism 170 uses a cable and housing arrangement (not shown) to lower the distance between static cable stop surface 142 of body portion 143*b* and dynamic cable stop surface 177 of plunger 171. Lowering the distance between cable stops 177 and 142 moves plunger 171 and plate 172 upward. Actuation rod contact surface 178 pushes actuation rod 164 upward, thereby opening the cartridge valve (not shown). FIG. 8 shows actuator mechanism 170 in a relaxed position. FIG. 9 shows actuator mechanism assembly 170 in an actuated position. In this example, the actuation rod contact surface 178 provides the upper most surface of the actuating mechanism 170 and defines plane B in FIGS. 9 and 10. A lower most surface 186 of the actuator assembly 140 defines a plane G (FIG. 3).

To help accommodate the movement of the actuating mechanism 170 this example of the actuator assembly 140 also includes an axially extending recess or channel 187 that is configured to receive the actuating mechanism 170. In this example the channel 187 is bounded by an upper end wall that coincides with the lower end wall 184 and is in communication with the rod aperture 185.

To help reduce the normalized post length of the assembly 100, the actuator assembly 140 is configured so that at least a portion of the actuator assembly 140 is disposed within the lower end of the outer tube 120 and is sized (e.g. has a diameter 187 that is less than in internal diameter of the inner tube 110) so that it can be nested within the interior 112 of the inner tube 110 when the inner tube 110 is retracted and the lower end surface 111 is resting on the tube stop surface 146. Other portions, such as the mounting portion 141 can have a different, larger diameter so that they can engage the larger, outer tube 120. In this arrangement, the length of the actuator assembly 140 that extends below the tube stop surface 146, and therefore contributes to normalized post length is illustrated as the effective actuator length 188 in FIG. 3. The actuator body 143 may also define a body length in the axial direction that is measured between planes D and G.

Increasing the amount of the actuator assembly 140 that can be nested within the inner tube 110 may help reduce the effective actuator length 188 (measured from plane F to surface 186), but it may be desirable in some embodiments to have at least some of the actuator assembly 140 exposed and extending below the lower end of the outer tube 120 to help facilitate connection of the activation cable. Preferably, the actuator assembly 140 can be configured so that the effective actuator length 188 is less than about 50 mm, may be less than about 35 mm and may be less than about 30 mm, less than about 25 mm and/or less than about 20 mm mm.

To help provide the desired nesting, the actuator assembly 140 is configured so that the portions provided above the mounting portion 141 and tube stop surface 146 are sized to fit within the inner diameter of the inner tube 110. Preferably, at least the upper end surface 149 and end wall of the cartridge receiving portion 147 can be nested within the inner tube 110 and located above the lower plane A when the inner tube 110 is retracted. Optionally, the actuator assembly 140 can be configured so that at least 10%, at least 20%, at least 30%, at least 40%, at least 50% or more of the actuator body length can be nested within the inner tube 110 when it is retracted. For example, optionally, the entire cartridge rod receiving portion 147 can be nested within the inner tube 110 and located above the lower plane A when the inner tube 110 is retracted, including the end wall 184 and rod aperture 185 along with portions of the channel 187 (while a lower portion of the channel extends below plane A). The lower end wall 184, and the lower end surface 166 of the cartridge rod 163 may be positioned so that it is above the lower plane A by at least about 1 mm, about 2 mm, about 3 mm, about 5 mm or more when the inner tube 110 is retracted.

When the inner tube 110 is in its retracted position in this example, as shown in FIGS. 9 and 10, entire cartridge rod receiving portion 147 along with the lower end of the cartridge rod 163 and actuation rod 164 are all nested within the inner tube 110 and above plane A when the inner tube 110 is retracted. In this arrangement, as shown, planes C, D, and E are all disposed above plane A when in the retracted position.

Whether plane B and the plate 172 are disposed above plane A can depend on the state of the actuating mechanism 170. In this example when the actuating mechanism 170 is in the relaxed position of FIG. 8 the plate 172 is outside the inner tube 110 and plane B is below plane A. This example of the actuator assembly 140 allows the actuating mechanism 170 changed from its relaxed position to its actuated position of FIG. 10 with the inner tube 110 retracted, thereby moving both plate 172 and plane B above plane A. In this example the channel 187 and the engagement member 172 are sized so that they are disposed laterally inboard of the inner tube (i.e. within a projection of the cross-sectional area of the inner tube 110) which can help facilitate the desired movement of the engagement member 172 independent of the position of the inner tube 110.

Referring again to FIGS. 3 and 4, the seat clamp assembly 150 in this example includes a pair of clamping channels 190 that each extend along respective channel axis 191. The channels 190 are sized to receive the seat rails of a standard bicycle seat, with the channel axes 191 being aligned with the seat rails when installed. The axes 191 are parallel to each other and lie in a common rail plane 192 (FIG. 3). The rail plane 192 may be inclined relative to the post axis 151 and will intersect the post axis 151 at a head point 193. The axial distance between the head point 193 and the plane 174 defines a head length 194, that can be less than about 50 mm, less than about 40 mm, less than about 30 mm or less than about 25 mm, and may be about 24 mm. Like the overlap length 176 and effective actuator length 188, the head length 194 remains fixed while the assembly 100 is in use and contributes to the normalized post length of the assembly 100. The head length 194 is, in this example, less than the effective actuator length 188 and overlap length 176.

Preferably, the assembly 100 is configured, such as by configuring the seat clamp assembly to reduce the head length 194, configuring the actuator assembly 140 to reduce the effective actuator length 188 and/or modifying the overlap length 176, so that normalized post length is less than about 160 mm, and preferably is less than about 150 mm, about 140 mm, about 130 mm, about 120 mm, about 110 mm or less. Preferably, this reduction in the normalized post length can be achieved while still providing a standard sized post assembly and providing a drop/travel length that is preferably at least 90 mm, at least 120 mm, at least 150 mm, at least 180 mm, at least 210 mm, at least 240 mm or more. This may provide an assembly in which a sum of the overlap length, the head length, the effective actuator length and two times the drop length defines a total post length that is between 300 mm or about 400 mm and about 585 mm, while still having a relatively small normalized post length of less than about 160 mm or less than about 140 mm.

Referring now to FIGS. 11-14, another example of an actuator assembly 240 that is useable with the dropper post assembly 100 is shown. The actuator assembly 240 is generally analogous to actuator assembly 240 and like features are annotated using like reference characters indexed by 200. In this example the actuator assembly 240 has a body portion 243, a cartridge rod receiving portion 247 for receiving the cartridge rod 263. The rod 263 is fastened to the body portion 243 via a threaded connection 245 (instead of bolts 145a, 145b). A tube stop surface 246 is provided next to the mounting portion 241. The rod end cap 268 of cartridge is also visible and is fixedly engaged with cartridge outer tube. Rod 263 slides axially through rod end cap 268 when cartridge is unlocked. Rod end cap 268 also has a lower end cap surface 269.

The actuator assembly 240 has an actuator body 243 that in this example is of integrally formed, one-piece construction. The body 243 includes a mounting portion 241 which in this example is configured to be engaged and retained using a circlip, rather than including a threaded connection. In this arrangement the actuator assembly 240 is separable from the outer tube via a single operation (e.g. removing the circlip) and in one piece (e.g. without requiring disassembly) when the mounting portion 241 is disconnected from the outer tube.

The region of the body 243 that is above the mounting portion 241 has, in this example been configured to provide a shoulder to accommodate and support a cushioning member which serves as the upwardly facing tube stop surface 246. In this arrangement, the tube stop surface 246 is removable from the lower tube with the actuator assembly 240.

The actuator body 243 also includes a cartridge rod receiving portion 247 that is configured to attach the cartridge rod 263 to the actuator body 243. In this example the cartridge rod receiving portion 247 includes an axially oriented cavity 282 that extends from an aperture 283 that is provided in an upper end surface 249 of the body portion which, in this example includes the upper most surface of the actuator assembly 240. The aperture 283 is sized to accommodate the end of the cartridge rod 263. The cavity 282 extends to an opposing lower end wall 284 that includes a rod aperture 285, which is sized to allow the tip of the actuation rod 264 to pass through. The cartridge rod 263 is threaded into the cavity 282.

The actuator assembly 240 also includes the actuating mechanism 270 which includes a lower arm 271 with dynamic cable stop surface 277, an engagement member 272 in the form of the upper arm that includes the actuation rod contact surface 278, pivot pins 273 and 274 and alignment pin 275. Actuator mechanism uses a cable and housing arrangement (not shown) to lower the distance between static cable stop surface 242 of body 243 and dynamic cable stop surface 277 of lower arm 271. Lowering the distance between cable stops 277 and 242 pivots lower arm 271 about pin 273 thereby pushing upper arm 272 upward while it pivots about pin 274. Upper arm 272 is aligned to body 243 by alignment pin 275. Actuation rod contact surface 278 pushes actuation rod 264 upward, thereby opening the cartridge valve (not shown). FIG. 13 shows actuator mechanism assembly in a relaxed position. FIG. 14 shows actuator mechanism in an actuated position. Like actuator mechanism 170, the engagement member 272 can be operated while the inner tube 110 is retracted, such that the plane B may be above or below plane A depending on the state of the actuator. In this example the channel 287 and engagement member 272 are laterally inboard the inner tube 110.

To help accommodate the movement of the actuating mechanism this example of the actuator assembly 240 also includes an axially extending recess or channel 287 that is configured to receive the actuating mechanism. In this example the channel 287 is bounded by an upper end wall that coincides with the lower end wall 284 and is in communication with the rod aperture 285.

To help reduce the normalized post length of the assembly 100, the actuator assembly 240 is configured so that at least a portion of the actuator assembly 240 is disposed within the lower end of the outer tube 120 and is sized so that it can be nested within the interior of the inner tube 110 when the inner tube 110 is retracted and the lower end surface 111 is resting on the tube stop surface 246. Other portions, such as the mounting portion 241 can have a different, larger diameter so that they can engage the larger, outer tube 120. In this arrangement, the length of the actuator assembly 240 that extends below the tube stop surface 246, and therefore contributes to normalized post length is illustrated as the effective actuator length. The actuator body 243 may also define a body length in the axial direction that is measured between planes D and G.

When the inner tube 110 is in its retracted position in his example, as shown in FIGS. 13 and 14, entire cartridge rod receiving portion 247 along with the lower end of the cartridge rod 263 and actuation rod 264 are all nested within the inner tube 110 and above plane A when the inner tube 110 is retracted. In this arrangement, as shown, planes C, D, and E are all disposed above plane A when in the retracted position.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent, or patent application was specifically and individually indicated to be incorporated by reference in its entirety.

I claim:

1. A dropper post assembly for supporting a bicycle seat, the dropper post assembly comprising:
   a) an outer tube extending along a post axis between a lower end and an upper end;
   b) an inner tube telescopically receivable in the outer tube and having an upper end comprising an upper travel edge defining an upper plane and a lower end that is disposed within the outer tube and comprising a lower end surface defining a lower plane, the inner tube being axially slidable within the outer tube between a retracted position in which the lower end of the inner tube is proximate the lower end of the outer tube and the lower plane is coplanar with a retraction plane, and an extended position in which the lower end of the inner tube is axially spaced from the retraction plane by a drop length (DL), a travel portion of the inner tube is exposed outside the outer tube and a lower portion of the inner tube remains axially overlapped within the lower tube defining an overlap length;
   c) a locking spring cartridge disposed at least partially within the inner tube and configured so that when the locking spring cartridge is locked relative axial movement between the outer tube and inner tube is inhibited, and when the locking spring cartridge is unlocked the inner tube is axially movable relative to the outer tube, and comprising an actuation rod that is translatable to unlock the locking spring cartridge;
   d) a seat clamp assembly connected to the upper end of the inner tube and comprising first and second clamping channels configured to retain first and second bicycle seat rails when in use, the first and second clamping channels extending along respective first and second channel axes that lie in a common rail plane that intersects the post axis at a head point, and wherein an distance between the head point and the upper plane defines a head length; and e) an actuator assembly at the lower end of the outer tube, the actuator assembly comprising an actuator body having a mounting portion connectable to the outer tube, a static cable stop surface that is axially below the retraction plane and connectable to an actuating cable, an axially uppermost surface and an opposing axially lower most surface that is spaced below the retraction plane by an effective actuator length, and an actuating mechanism comprising a dynamic cable stop surface that is axially below the retraction plane and connectable to the actuating cable and an engagement member that is axially slidable relative to the actuator body, wherein applying a tension via the actuator cable urges the dynamic cable stop axially toward the static cable stop whereby the engagement member is urged upwardly and translates the actuation rod to unlock the locking spring cartridge; and wherein the dropper post assembly is configured so that a sum of the overlap length, the head length and the effective actuator length defines a normalized post length (NPL) that is less than or equal to about 140 mm.

2. The dropper post assembly of claim 1, wherein the engagement member comprises an actuation rod contact surface that is movable with the engagement member and is configured so that when the locking spring cartridge is unlocked the actuation rod contact surface is above the retraction plane.

3. The dropper post assembly of claim 2, wherein when the locking spring cartridge is locked the actuation rod contact surface is below the retraction plane.

4. The dropper post assembly of claim 1, wherein the engagement member comprises an actuation rod contact surface that is movable with the engagement member and is configured so that when the inner tube is in the retracted position and the locking spring cartridge is unlocked the actuation rod contact surface is above the lower plane and is nested within the lower end of the inner tube.

5. The dropper post assembly of claim 1, wherein a ratio of normalized post length to drop length (NPL/DL) is less than about 75%.

6. The dropper post assembly of claim 2, wherein the ratio of normalized post length to drop length (NPL/DL) is less than about 60%.

7. The dropper post assembly of claim 1, wherein the locking spring cartridge has a cartridge outer tube disposed within and movable with the inner tube and a cartridge rod extending from the cartridge outer tube to a lower end that is received within a cartridge rod receiving portion of the actuator assembly, wherein the actuation rod is translatable within the cartridge rod to unlock the locking spring cartridge, and wherein when the inner tube is in the retracted position the lower end of the cartridge rod is disposed within the inner tube and above the lower plane.

8. The dropper post assembly of claim 1, wherein the overlap length is at least 70 mm.

9. The dropper post assembly of claim 1, wherein the normalized post length (NPL) that is less than or equal to about 135 mm.

10. The dropper post assembly of claim 1, wherein the drop length is between about 150 mm and about 240 mm.

11. The dropper post assembly of claim 1, wherein the effective actuator length is less than 40 mm.

12. The dropper post assembly of claim 1, wherein a sum of the overlap length, the head length, the effective actuator length and two times the drop length defines a total post length that is between 400 mm and about 630 mm.

13. The dropper post of claim 1, wherein the actuator assembly is separable from the outer tube via a single operation when the mounting portion is disconnected from the outer tube.

14. The dropper post of claim 1, wherein the actuator body has a length in the axial direction between the axially uppermost and the axially lowermost surfaces, and wherein when the inner tube is in the retracted position at least 10% of the length of the actuator body is nested within the inner tube.

15. A dropper post assembly for supporting a bicycle seat, the dropper post assembly comprising:
   a) an outer tube extending along a post axis between a lower end and an upper end;
   b) an inner tube telescopically receivable in the outer tube;
   c) a collar assembly removably connectable to the upper end of the outer tube via engaging threads on the collar assembly with threads on an interior surface of the outer tube, the collar assembly configured to cap the outer tube and to retain and slidably support the inner tube;
   d) the inner tube having an upper end comprising an upper travel edge defining an upper plane that is above the collar assembly and a lower end that is disposed below the collar assembly and within the outer tube and comprising a lower end surface defining a lower plane, the inner tube being axially slidable relative to the collar assembly and within the outer tube between a retracted position in which the lower end of the inner tube is proximate the lower end of the outer tube and the lower plane is coplanar with a retraction plane, and an extended position in which the lower end of the inner tube is axially spaced from the retraction plane by a drop length (DL), a travel portion of the inner tube is exposed outside the outer tube and above the collar assembly and a lower portion of the inner tube remains axially overlapped within the lower tube defining an overlap length;
   e) a seat clamp assembly connected to the upper end of the inner tube and comprising first and second clamping channels configured to retain first and second bicycle seat rails when in use, the first and second clamping channels extending along respective first and second channel axes that lie in a common rail plane that intersects the post axis at a head point, and wherein an distance between the head point and the upper plane defines a head length; and
   f) an actuator assembly at the lower end of the outer tube, the actuator assembly comprising an actuator body having a mounting portion connectable to the outer tube and a length in the axial direction between an axially uppermost surface and an opposing axially lower most surface, the lower most surface being spaced below the retraction plane by an effective actuator length;
   wherein the dropper post assembly is configured so that when the inner tube is in the retracted position at least 10% of the length of the actuator body is nested within the inner tube, and that a sum of the overlap length, the head length and the effective actuator length defines a normalized post length (NPL) that is less than about 160 mm.

16. The dropper post assembly of claim 15, wherein the collar assembly comprises and at least one of a bushing and a seal to engage the inner tube.

17. The dropper post assembly of claim 15, wherein the normalized post length is less than or equal to about 140 mm and the effective actuator length is less than 40 mm.

18. The dropper post assembly of claim 15, wherein the normalized post length is less than about 140 mm and wherein the overlap length is at least 80 mm, and the drop length is between about 150 mm and about 240 mm.

19. The dropper post assembly of claim 15, wherein a sum of the overlap length, the head length, the effective actuator length and two times the drop length defines a total post length that is between 400 mm and about 630 mm.

20. The dropper post of claim 15, wherein a ratio of normalized post length to drop length (NPL/DL) is less than about 75%.

* * * * *